(12) United States Patent
Mukherjee et al.

(10) Patent No.: US 8,356,114 B2
(45) Date of Patent: Jan. 15, 2013

(54) REGION OF INTEREST-BASED IMAGE TRANSFER

(75) Inventors: Uddipan Mukherjee, Irvine, CA (US); Don Hideyasu Matsubayashi, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/761,344

(22) Filed: Apr. 15, 2010

(65) Prior Publication Data

US 2011/0258344 A1   Oct. 20, 2011

(51) Int. Cl.
*G06F 13/00* (2006.01)
(52) U.S. Cl. ........................................................ 709/247
(58) Field of Classification Search .................. 209/247; 358/1.18
See application file for complete search history.

(56) References Cited

U.S. PATENT DOCUMENTS

| | | | |
|---|---|---|---|
| 5,946,043 A | 8/1999 | Lee et al. | |
| 5,991,816 A | 11/1999 | Percival et al. | |
| 6,256,423 B1 | 7/2001 | Krishnamurthy et al. | |
| 6,314,452 B1 | 11/2001 | Dekel et al. | |
| 6,496,607 B1 | 12/2002 | Krishnamurthy et al. | |
| 6,775,412 B1 | 8/2004 | Nister et al. | |
| 6,804,405 B2 | 10/2004 | Christopoulos et al. | |
| 6,909,745 B1 | 6/2005 | Puri et al. | |
| 7,206,456 B2 | 4/2007 | Hannuksela et al. | |
| 7,221,804 B2 | 5/2007 | Atsumi et al. | |
| 7,260,614 B2 | 8/2007 | Deshpande et al. | |
| 7,290,011 B2 | 10/2007 | Eldar et al. | |
| 7,571,382 B2 | 8/2009 | Larsson et al. | |
| 7,587,261 B2 | 9/2009 | Hopkins | |
| 2010/0091330 A1* | 4/2010 | Marchesotti et al. | 358/1.18 |

OTHER PUBLICATIONS

Liu et al., "Automatic Browsing of Large Pictures on Mobile Devices", Int'l Multimedia Conference, Proceedings on the Eleventh ACM International Conference on Multimedia, pp. 148-155, (2003).
Int'l Telecommunication Union, Recommendation T.81, Information Technology—Digital Compression and Coding of Continuous-tone Still Images—Requirements and Guidelines (1992).
Int'l Telecommunication Union, ITU-T Recommendation H.264, Advanced Video Coding for Generic Audiovisual Services (2005).

* cited by examiner

*Primary Examiner* — Robert B Harrell
(74) *Attorney, Agent, or Firm* — Fitzpatrick, Cella, Harper & Scinto

(57) ABSTRACT

Image data of an image is transmitted from a first computer to a second computer over a network. A region of interest in the image is identified by a first computer by calculations using image data. Coordinates for the region of interest are transmitted from the first computer to the second computer. Image data for the region of interest is encoded. Encoded image data for the region of interest is transmitted from the first computer to the second computer for decoding and display at a position corresponding to the transmitted coordinates. A region surrounding the region of interest is identified by the first computer. Coordinates for the region surrounding the region of interest are transmitted. Image data for the region surrounding the region of interest is encoded. Encoded image data for the region surrounding the region of interest is transmitted for display at a position corresponding to the transmitted coordinates.

56 Claims, 9 Drawing Sheets

REGION OF INTEREST-BASED IMAGE TRANSFER

FIELD

The present disclosure relates to transmission of image data, and more specifically relates to transmitting image data over a network from a first computer to a second computer.

BACKGROUND

In the field of image transmission, image data is typically encoded before being transmitted over a network to a receiving computer. The encoding process is usually performed by processing the image data in a predesignated scanning order. The encoded image data is then typically transmitted to a receiving computer in the same predesignated scanning order, where the image data is processed to recreate the image.

One method of encoding involves processing the image data in a raster scan order, where the image data is arranged and processed row by row. Another method involves processing the image data in a zigzag order, where processing begins from the top-left corner of the image and proceeds in a zigzag pattern towards the bottom-right corner of the image.

SUMMARY

One difficulty with such implementations arises in bandwidth constrained networks, where a receiving computer may not be able to display visually significant features in an image until a substantial portion of the image data has been received. For example, image data transmitted using a raster order would be displayed sequentially, row by row, beginning with the upper portion of the image. As a consequence, display of any visually significant features that happen to be located near the bottom of the image would be postponed until transmission of those rows. This difficulty may be exacerbated in situations where the network transmission is terminated prematurely, where the display of a visually significant feature might be precluded entirely.

Another difficulty with such implementations is that transmission of the encoded image data may be performed in a single pass, thereby resulting in the transmission of a large number of bits for the image data.

The foregoing situation is addressed herein by identifying regions of interest in an image prior to the encoding process, and prioritizing the transmission of the identified regions of interest. The identified region of interest might be transmitted, for example, in an order starting from the center of the region of interest, spiraling outwardly toward the edges of the region of interest. Furthermore, the image data may be progressively encoded and transmitted, from a coarser level to a finer level, where the progressive encoding results in an improvement in the visual quality of image displayed by the receiving computer.

As described herein, the region of interest is determined automatically based on calculations using the image data, such as, face detection calculations, edge detection calculations, and spatial frequency calculations.

Thus, in an example embodiment described herein, image data is transmitted from a first computer to a second computer over a network. Image data is encoded, where the encoded image data has a lower quality portion and a higher quality portion. A region of interest in the image is identified by the first computer, where the first computer identifies the region of interest by calculations using the image data. Coordinates for the region of interest are transmitted from the first computer to the second computer. A lower quality portion of the encoded image data for the region of interest is transmitted to the second computer for decoding and display by the second computer at a position corresponding to the transmitted coordinates for the region of interest.

According to this embodiment, a region surrounding the region of interest is identified by the first computer. Coordinates for the region surrounding the region of interest are transmitted to the second computer. After transmission of the lower quality portion of the encoded image data for the region of interest, the lower quality portion of the encoded image data for the region surrounding the region of interest is transmitted to the second computer for decoding and display by the second computer at a position corresponding to the transmitted coordinates for the region surrounding the region of interest.

Further to this embodiment, after transmission of the lower quality portion of the encoded image data for the region surrounding the region of interest, the higher quality portion of the encoded image data for the region of interest is transmitted for decoding and display by the second computer at a position corresponding to the transmitted coordinates for the region of interest. The higher quality portion of the encoded image data for the region surrounding the region of interest is transmitted for display by the second computer at a position corresponding to the transmitted coordinates for the region surrounding the region of interest. This transmission can occur before or after transmission of the higher quality portion of the region of interest.

By prioritizing transmission of a region of interest, it is ordinarily possible to reduce the amount of time needed to display the visually significant portions of an image. In addition, since encoded image data is progressively transmitted, it is ordinarily possible to initially display regions of interest and regions surrounding the regions of interest sooner than implementations transmitting image data in a fixed scanning order.

In another example embodiment, the encoding quality of the region of interest and the region surrounding the region of interest is adjusted depending on limitations imposed by a user or the network.

In still another example embodiment, the encoding quality of the image data is scaled for each region surrounding the region of interest based on a distance between each region and the region of interest.

In other example embodiments described herein, image data is received from a first computer at a second computer over a network. Coordinates for the region of interest are received from the first computer at the second computer. A lower quality portion of the encoded image data for the region of interest is received. The lower quality portion of the encoded image data for the region of interest is decoded. The decoded lower quality portion of the encoded image data for the region of interest is displayed at a position corresponding to the received coordinates for the region of interest.

According to this embodiment, coordinates for the region surrounding the region of interest are received from the first computer at the second computer. After reception of the lower quality portion of the encoded image data for the region of interest, a lower quality portion of the encoded image data for the region surrounding the region of interest is received. The lower quality portion of the encoded image data for the region surrounding the region of interest is decoded. The decoded lower quality portion of the encoded image data for the region surrounding the region of interest is displayed at a position corresponding to the received coordinates for the region surrounding the region of interest.

Further to this embodiment, a higher quality portion of the encoded image data for the region of interest is received. The higher quality portion of the encoded image data for the region of interest is decoded. The decoded higher quality portion of the encoded image data for the region of interest is displayed at a position corresponding to the received coordinates for the region of interest, where the decoded higher quality portion for the region of interest is displayed after display of the decoded lower quality portion for the region surrounding the region of interest. The higher quality portion of the encoded image data for the region surrounding the region of interest is received, decoded, and displayed. This reception can occur before or after reception of the higher quality portion of the region of interest.

This brief summary has been provided so that the nature of this disclosure may be understood quickly. A more complete understanding can be obtained by reference to the following detailed description and to the attached drawings.

DETAILED DESCRIPTION

Figure 1:
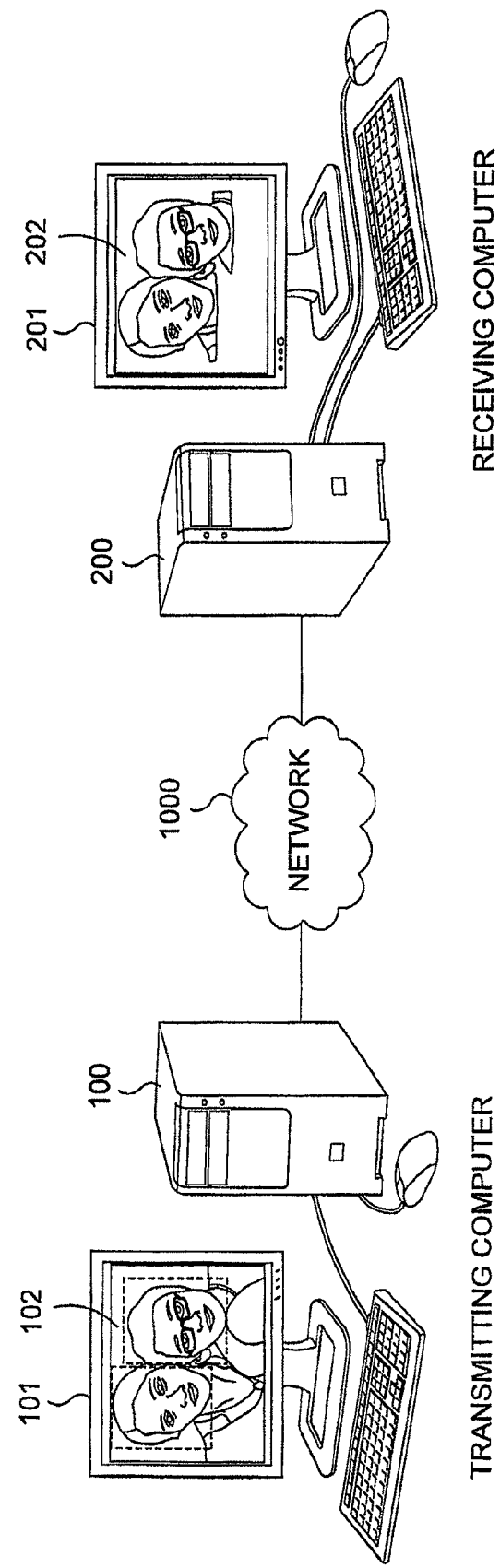
FIG. 1 is a representative view of computing equipment relevant to one example embodiment.

FIG. 1 is a representative view of computing equipment relevant to one example embodiment.

As shown in FIG. 1, transmitting computer 100 is connected to receiving computer 200 via network 1000. Transmitting computer 100 communicates with receiving computer 200 via network 1000 to transmit image data. As depicted diagrammatically in FIG. 1, transmitting computer 100 has image data 102 for which encoding and transmission to receiving computer 200 is effected. FIG. 1 also shows receiving computer 200 displaying the image data 202 that was encoded and transmitted by transmitting computer 100.

The particular implementation, scale, and hardware of network 1000 may vary according to different embodiments. Thus, for example, network 1000 could be the Internet, a Local Area Network (LAN), Wide Area Network (WAN), Metropolitan Area Network (MAN), or Personal Area Network (PAN), among others. Network 1000 can be wired or wireless, and can be implemented, for example, as an Optical fiber, Ethernet, or Wireless LAN network. In addition, the network topology of network 1000 may also vary.

Figure 2:
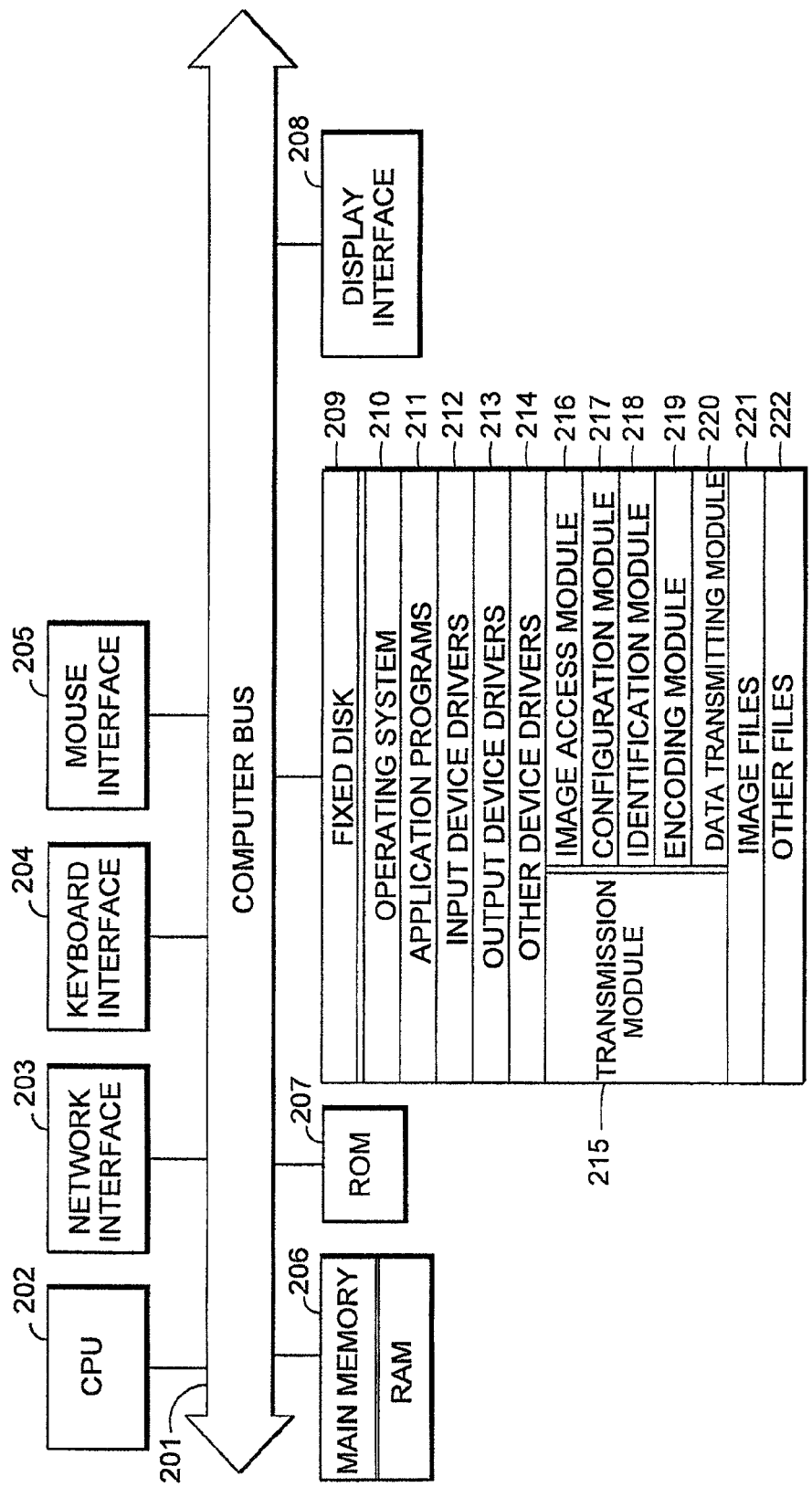
FIG. 2 is a detailed block diagram depicting the internal architecture of the transmitting computer shown in FIG. 1.

FIG. 2 is a detailed block diagram depicting the internal architecture of transmitting computer 100 shown in FIG. 1.

As shown in FIG. 2, transmitting computer 100 includes central processing unit (CPU) 202 which interfaces with computer bus 201. Also interfacing with computer bus 201 are fixed disk 209 (e.g., a hard disk or other nonvolatile storage medium), network interface 203, keyboard interface 204, mouse interface 205, random access memory (RAM) 206 for use as a main run-time transient memory, read only memory (ROM) 207, display interface 208, and transmission module 215. Transmitting computer 100 may use network interface 203 to communicate with the receiving computer 200 via network 1000 (not shown).

RAM 206 interfaces with computer bus 201 so as to provide information stored in RAM 206 to CPU 202 during execution of the instructions in software programs, such as an operating system, application programs, image processing modules, and device drivers. More specifically, CPU 202 first loads computer-executable process steps from fixed disk 209, or another storage device into a region of RAM 206. CPU 202 can then execute the stored process steps from RAM 206 in order to execute the loaded computer-executable process steps. Data, such as image data, or other information, is stored in RAM 206 and the data is accessed by CPU 202 during the execution of the computer-executable software programs, to the extent that such software programs have a need to access and/or modify the data.

As also shown in FIG. 2, fixed disk 209 is an example of a computer-readable storage medium that stores computer-executable process steps for operating system 210, and application programs 211, such as word processing programs or graphic image management programs. Fixed disk 209 also stores computer-executable process steps for device drivers for software interface to devices, such as input device drivers 212, output device drivers 213, and other device drivers 214. Image files 221, including scanned image files, are stored for encoding and transmission to the receiving computer 200.

Transmission module 215 comprises computer-executable process steps stored on a computer-readable storage medium for execution by a processor, such as CPU 202, to identify, encode, and transmit image data. Transmission module 215 generally comprises an image access module 216, a configuration module 217, an identification module 218, an encoding module 219, and a data transmitting module 220. These modules are described in greater detail below in connection with FIG. 4.

The computer-executable process steps for transmission module 215 may be configured as part of operating system 210, as part of an output device driver, such as an image processing driver, or as a stand-alone application program. Transmission module 215 may also be configured as a plug-in or dynamic link library (DLL) to the operating system, device driver or application program.

Figure 3:
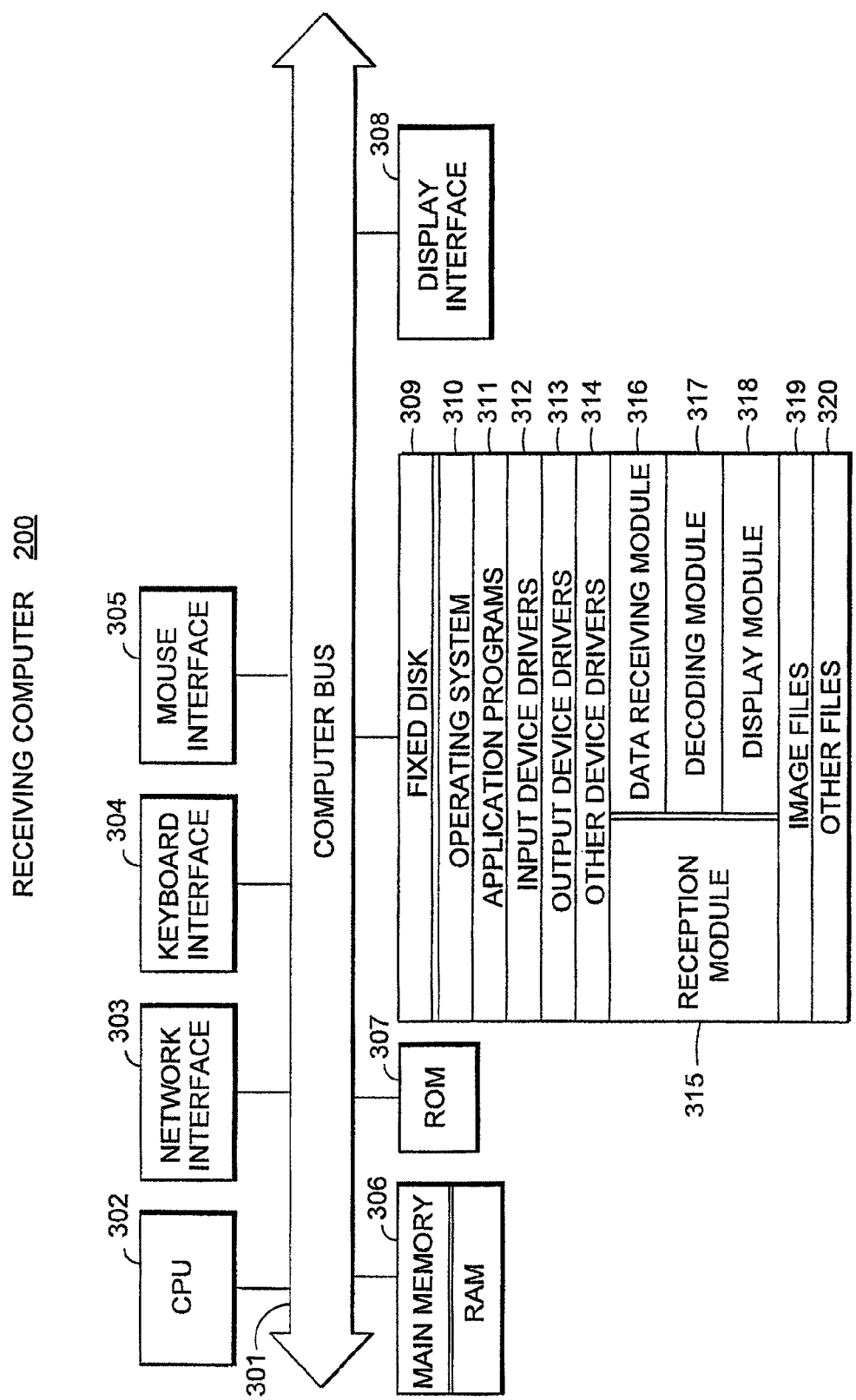
FIG. 3 is a detailed block diagram depicting the internal architecture of the receiving computer shown in FIG. 1.

FIG. 3 is a detailed block diagram depicting the internal architecture of receiving computer 200 shown in FIG. 1.

As shown in FIG. 3, receiving computer 200 includes central processing unit (CPU) 302 which interfaces with computer bus 301. Also interfacing with computer bus 301 are fixed disk 309 (e.g., a hard disk or other nonvolatile storage medium), network interface 303, keyboard interface 304, mouse interface 305, random access memory (RAM) 306 for use as a main run-time transient memory, read only memory (ROM) 307, display interface 308 for displaying received image data, and reception module 315. Receiving computer 200 may use network interface 303 to communicate with transmission computer 100 via network 1000 (not shown).

RAM 306 interfaces with computer bus 301 so as to provide information stored in RAM 306 to CPU 302 during execution of the instructions in software programs, such as an operating system, application programs, image processing modules, and device drivers. More specifically, CPU 302 first loads computer-executable process steps from fixed disk 309, or another storage device into a region of RAM 306. CPU 302 can then execute the stored process steps from RAM 306 in order to execute the loaded computer-executable process steps. Data or other information is stored in RAM 306 and the data is accessed by CPU 302 during the execution of the computer-executable software programs, to the extent that such software programs have a need to access and/or modify the data.

As also shown in FIG. 3, fixed disk 309 is an example of a computer-readable storage medium that stores computer-executable process steps for operating system 310, and application programs 311, such as word processing programs or graphic image management programs. Fixed disk 309 also stores computer-executable process steps for device drivers for software interface to devices, such as input device drivers 312, output device drivers 313, and other device drivers 314.

Reception module 315 comprises computer-executable process steps stored on a computer-readable storage medium for execution by a processor, such as CPU 202, to receive and decode image data. Reception module 315 generally comprises data receiving module 316, decoding module 317, and display module 318. These modules are described in greater detail below in connection with FIG. 4.

The computer-executable process steps for reception module 315 may be configured as part of operating system 310, as part of an output device driver, such as an image processing driver, or as a stand-alone application program. Reception module 315 may also be configured as a plug-in or dynamic link library (DLL) to the operating system, device driver or application program.

Figure 4:
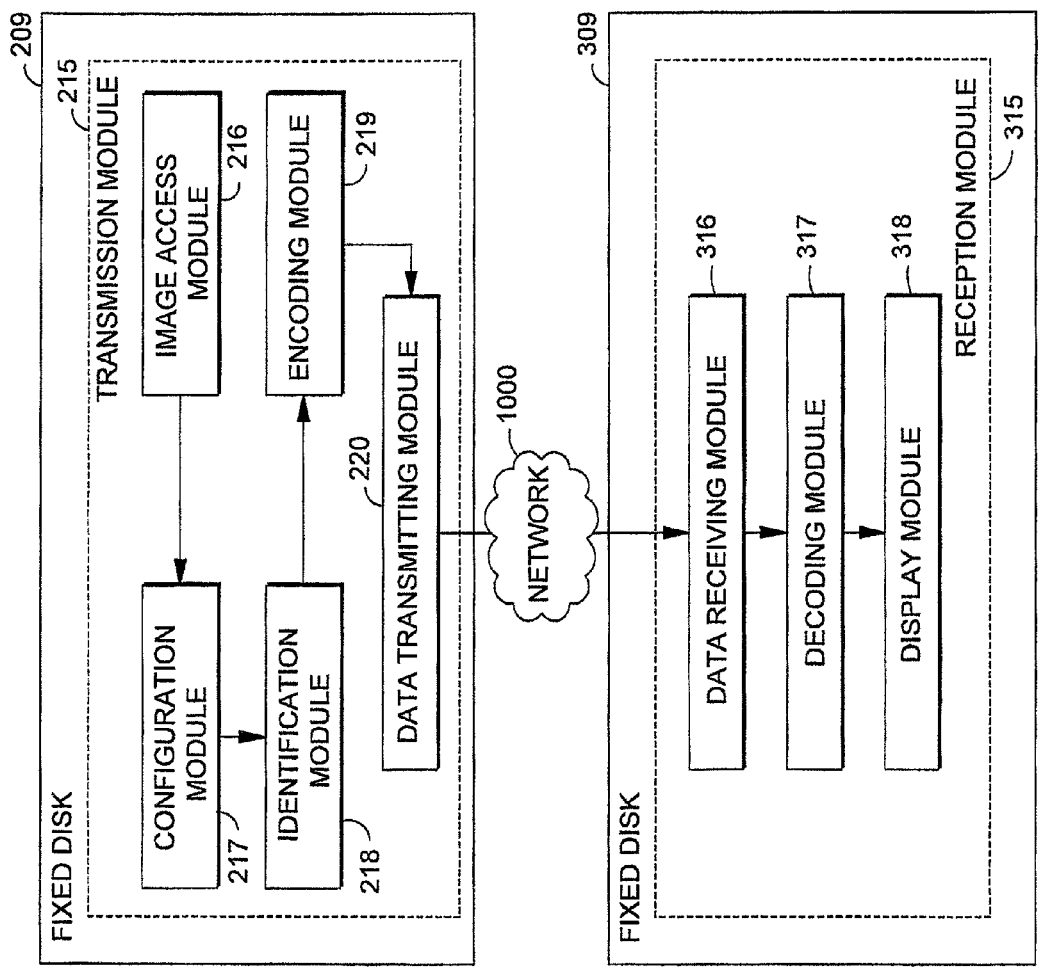
FIG. 4 illustrates interaction between an example transmission module and an example reception module.

FIG. 4 illustrates interaction between an example transmission module 215 and an example reception module 315.

In particular, FIG. 4 illustrates one example of transmission module 215 in which the sub-modules of transmission module 215 are stored in fixed disk 209. Specifically, FIG. 4 illustrates one example of the transmission module 215 that is constructed to transmit image data of an image from transmitting computer 100 to receiving computer 200 over a network 1000. As shown in FIG. 4, transmission module 215 comprises an image access module 216, a configuration module 217, an identification module 218, an encoding module 219, and a data transmitting module 220. Each of these modules are computer-executable software code or process steps executable by a processor, such as CPU 202, and are stored on a computer-readable storage medium, such as fixed disk 209 or RAM 206. More or fewer modules may be used than shown in FIG. 4, and other architectures are possible.

As shown in FIG. 4, the transmission module 215 includes an image access module 216 that is constructed to access image files for transmission to the receiving computer 200.

Transmission module 215 includes a configuration module 217 that is constructed to establish the encoding quality of the image files selected for transmission to the receiving computer 200.

Transmission module 215 further includes an identification module 218 that is constructed to identify a region of interest in an image using face detection calculations on the image data.

According to another example embodiment, the identification module 218 is constructed to identify a region of interest in an image using edge detection calculations on the image data. In still another example embodiment, the identification module 218 is constructed to identify a region of interest in an image using spatial frequency calculations on the image data. These example embodiments are discussed more fully below.

The identification module 218 is also constructed to identify regions surrounding the region of interest for transmission to a receiving computer 200.

Transmission module 215 also includes an encoding module 219 that is constructed to convert images from RGB color space to $Y'C_BC_R$ color space, and to store the image in separate $Y'$ (luminance), $C_B$ (chrominance blue) and $C_R$ (chrominance red) color planes. The encoding module 219 is also constructed to resize images, so that the region of interest and the regions surrounding the region of interest can be subdivided into 8×8 blocks of pixels. In particular, the encoding module 219 is further constructed to encode the image data, where the encoded image data has a lower quality portion and a higher quality portion.

Transmission module 215 further includes a data transmitting module 220 that is constructed to transmit coordinates for the region of interest and the region surrounding the region of interest from the transmitting computer 100 to the receiving computer 200. In addition, the data transmitting module 220 is constructed to transmit a lower quality portion and a higher quality portion of the encoded image data for the region of interest to the receiving computer 200 for decoding and display by the receiving computer 200 at a position corresponding to the transmitted coordinates for the region of interest. Further, the data transmitting module 220 is also constructed to transmit a lower quality portion and a higher quality portion of the encoded image data for the region surrounding the region of interest to the receiving computer 200 for decoding and display by the receiving computer 200 at a position corresponding to the transmitted coordinates for the region surrounding region of interest.

The data transmitting module 220 is also constructed to transmit image information, such as, image dimensions, the number of regions of interest that are being transmitted, and the image quality scale map.

FIG. 4 also illustrates one example of reception module 315 in which the sub-modules of reception module 315 are stored in fixed disk 309. Specifically, FIG. 4 illustrates one example of the reception module 315 that is constructed to receive image data of an image from the transmitting computer 100 at the receiving computer 200 over a network. As shown in FIG. 4, reception module 315 comprises a data receiving module 316, a decoding module 317, and a display module 318. Each of these modules are computer-executable software code or process steps executable by a processor, such as CPU 302, and are stored on a computer-readable storage medium, such as fixed disk 309 or RAM 306. More or fewer modules may be used than shown in FIG. 4, and other architectures are possible.

As shown in FIG. 4, the reception module 315 includes a data receiving module 316 that is constructed to receive coordinates for the region of interest and the region surrounding the region of interest. In addition, the data receiving module 315 is constructed to receive a lower quality portion and a higher quality portion of the encoded image data for the region of interest. Further, the data receiving module 315 is also constructed to receive a lower quality portion and a higher quality portion of the encoded image data for the region surrounding the region of interest.

The data receiving module 316 is also constructed to receive the image dimensions, the number of regions of interest that were detected in the image, and the image quality scale map.

Reception module 315 includes a decoding module 317 that is constructed to decode the received encoded image data for the region of interest and the region surrounding the region of interest, and to convert the decoded image data from Y'$C_B C_R$ color space to RGB color space.

Reception module 315 also includes a display module 318 that is constructed to display the decoded portion of the encoded image data for the region of interest at a position corresponding to the received coordinates for the region of interest, and further constructed to display the decoded portion of the encoded image data for the region surrounding the region of interest at a position corresponding to the received coordinates for the region surrounding the region of interest.

Figure 5:
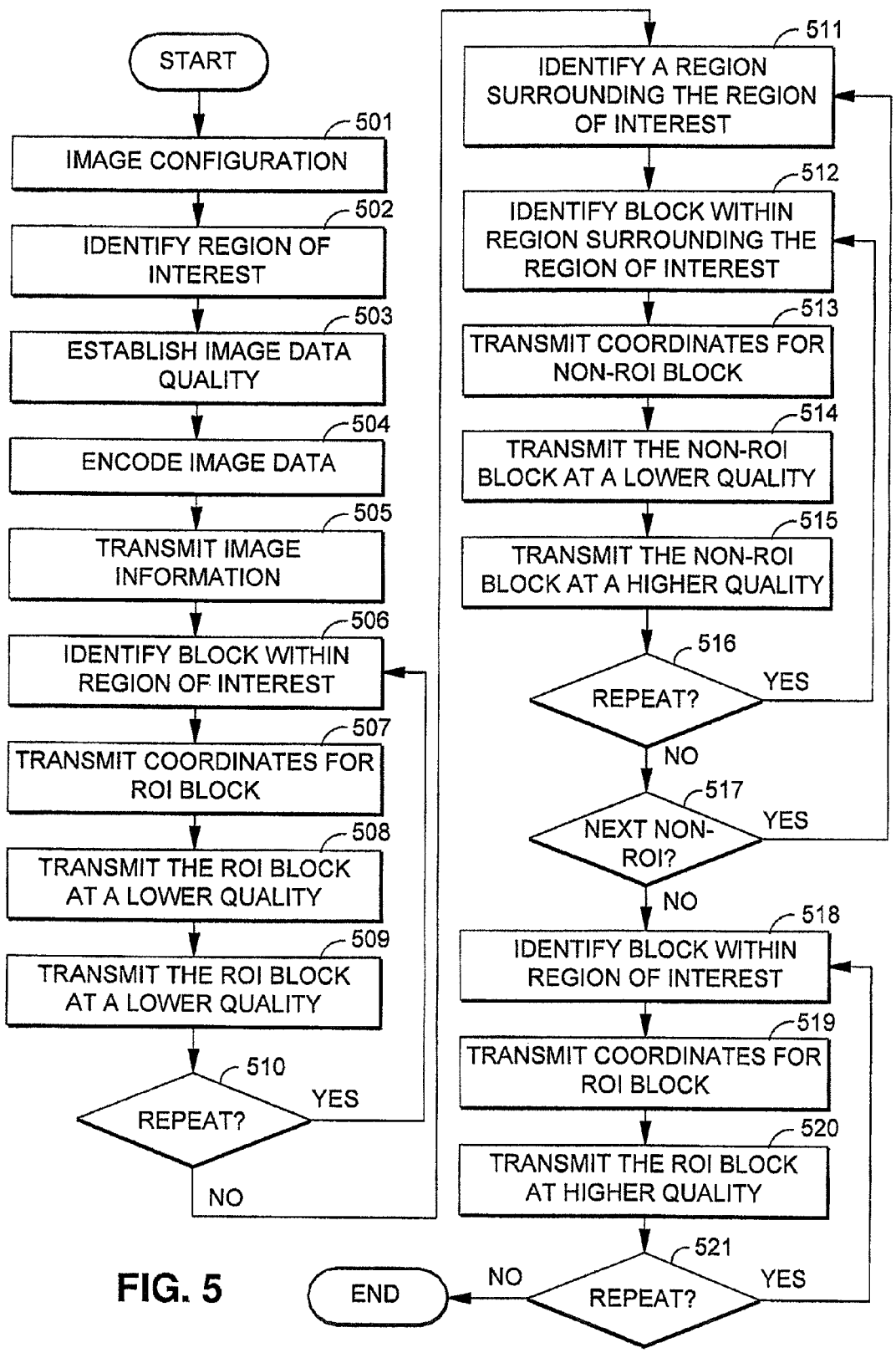
FIG. 5 is a flowchart illustrating an example process for explaining the image transmission process.

FIG. 5 is a flowchart illustrating an example process for explaining the image transmission process.

Briefly, in FIG. 5, image data is transmitted from a first computer to a second computer over a network. Image data is encoded, where the encoded image data has a lower quality portion and a higher quality portion. A region of interest in the image is identified by the first computer, where the first computer identifies the region of interest by calculations using the image data. Coordinates for the region of interest are transmitted from the first computer to the second computer. A lower quality portion of the encoded image data for the region of interest is transmitted to the second computer for decoding and display by the second computer at a position corresponding to the transmitted coordinates for the region of interest.

According to this embodiment, a region surrounding the region of interest is identified by the first computer. Coordinates for the region surrounding the region of interest are transmitted to the second computer. After transmission of the lower quality portion of the encoded image data for the region of interest, the lower quality portion of the encoded image data for the region surrounding the region of interest is transmitted to the second computer for decoding and display by the second computer at a position corresponding to the transmitted coordinates for the region surrounding the region of interest.

Further to this embodiment, after transmission of the lower quality portion of the encoded image data for the region surrounding the region of interest, the higher quality portion of the encoded image data for the region of interest is transmitted for decoding and display by the second computer at a position corresponding to the transmitted coordinates for the region of interest.

In more detail, the process in the transmitting computer 100 starts in step 501, where an image is identified and configured for transmission. In this regard, configuration module 217 of transmitting computer 100 establishes the encoding quality of the image data by defining quality variables, such as Qmin and Qmax. The Qmin quality variable defines the lowest quality at which image data will be encoded. The Qmax quality variable defines the highest quality at which image data will be encoded. According to this embodiment, Qmin and Qmax are predefined to encode the image data at a low quality level and a high quality level. As an example, a Qmin and a Qmax set to 100 signifies that the region of interest and the regions surrounding the region of interest will be encoded at full image quality. The encoding process is explained more fully below in connection with step 503.

In an another embodiment, the encoding quality of the region of interest and the region surrounding the region of interest is adjusted depending on limitations imposed by a user or the network. For example, the Qmin and Qmax quality variables may be set manually by a user. Alternatively, the Qmin and Qmax quality variables may be set automatically based on the level of traffic detected in the network.

The encoding module 219 of transmitting computer 100 prepares the image for encoding and transmission to the receiving computer 200 by converting the image from RGB color space to Y'$C_B C_R$ color space, and storing the converted image data in separate Y' (luminance), $C_B$ (chrominance blue) and $C_R$ (chrominance red) color planes. The image data for the Y', $C_B$, and $C_R$ color planes is stored for later processing, as discussed below. The image data may be stored in arrays, where the image data for each color plane is stored in a separate array.

According to this example embodiment, the region of interest and the region surrounding the region of interest are comprised of blocks of pixels, and wherein the step of transmitting is performed on the blocks of pixels.

Thus, the encoding module 218 of transmitting computer 100 also resizes the image so that the region of interest and the regions surrounding the region of interest can be subdivided into 8×8 blocks of pixels. In other example embodiments, the image may be resized to facilitate subdivision of the image into blocks of pixels of other sizes, such as 4×4 blocks of pixels.

Figure 7:
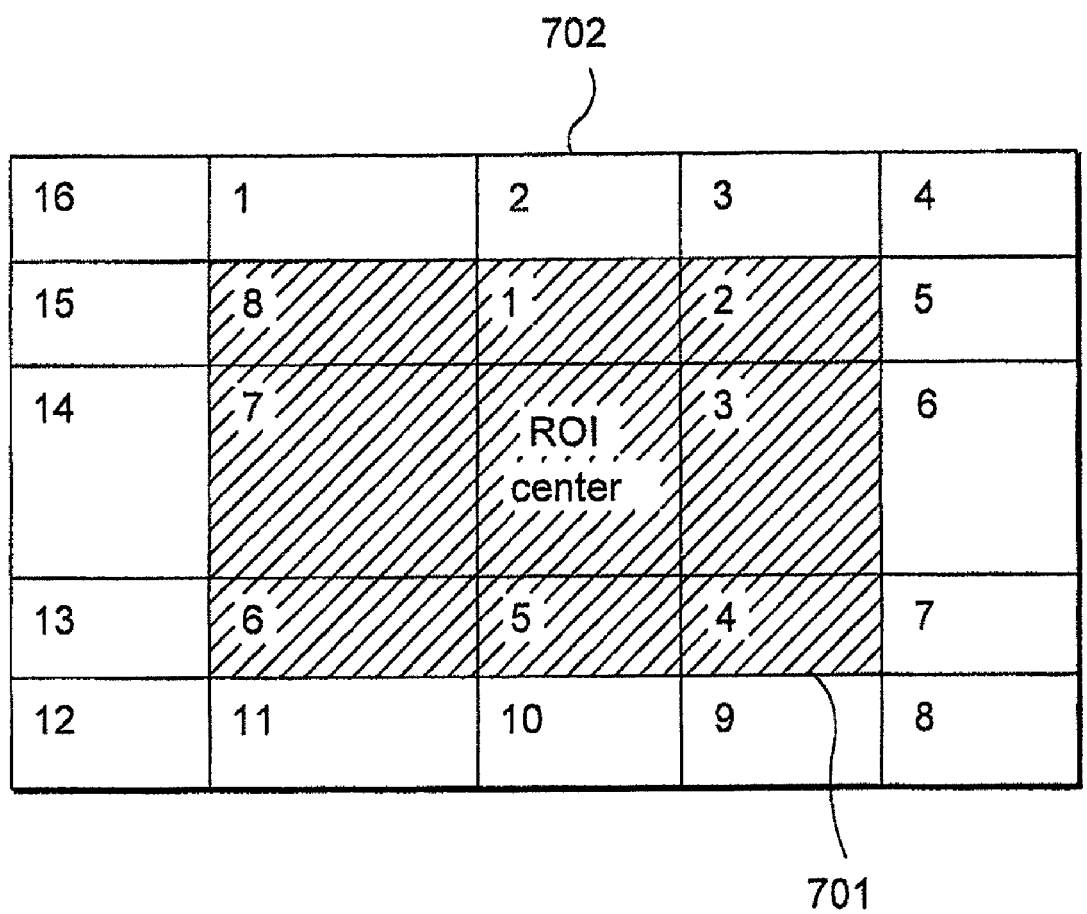
FIG. 7 is a view for explaining an example transmission order for image data, where the image data is comprised of blocks of pixels.

By way of example, FIG. 7 illustrates the subdivision of an image, where the region of interest and the region surrounding the region of interest are comprised of blocks of pixels, and wherein the step of transmitting is performed on the blocks of pixels.

In step 502, the identification module 218 of transmitting computer 100 identifies a region of interest in the image, where the region of interest is identified by face detection calculations on the image data. The identification module 218 of transmitting computer 100 performs the face detection calculations on the image data for each Y', $C_B$, and $C_R$ color plane, which was previously separated into Y', $C_B$, and $C_R$ color planes in step 501.

In other embodiments, identification of regions of interest can be effected using calculations on the image data different from or in combination with face detection calculations. For example, in another example embodiment, the identification module 218 of transmitting computer 100 identifies the region of interest using edge detection calculations on the image data, where a region of interest in an image may be identified by detecting discontinuities in the image brightness.

In still another example embodiment, the identification of the region of interest uses spatial frequency calculations on the image data. Since different spatial frequencies convey different information about the appearance of a stimulus, the identification module 218 of transmitting computer 100 may identify a region of interest in an image based the type of spatial frequency detected. For example, a high spatial frequency may indicate edges that characterize an in-focus foreground region of interest, whereas a low spatial frequency may indicate an out-of-focus background region of lesser interest.

The present disclosure contemplates incorporating machine learning and data mining techniques into the region of interest identification techniques described above, thereby facilitating detection of the region of interest based on patterns uncovered in samples of data. Metadata may also be incorporated into the image data, in order to provide information on the content of the image data. As a result, the region of interest identification techniques may distinguish between specific faces shown in an image. For example, in a photograph containing multiple faces, the region of interest identification techniques may be able to distinguish between an individual's friends and non-friends.

Further, using the machine learning, data mining, or metadata techniques described above, the region of interest may be identified based on a given setting. For example, if information derived from data mining indicates that an image is of a wedding, the region of interest techniques may identify the bride and groom as the regions of interest. In a further example, if the metadata associated with an image indicates that the image is of a race track, the region of interest techniques may identify cars or horses as the regions of interest.

Further to the above, block recognition or block selection techniques may be employed to identify a region of interest. Such techniques classify different regions of an image into different classifications, based on characteristics of the regions. For example, a region of interest may be identified by identifying the individual blocks of pixels that represent the region of interest.

The present disclosure also contemplates the identification and transmission of a plurality of regions of interest.

In step 503, the transmission computer 100 performs calculations to determine the encoding quality for the various regions of the image data.

According to this embodiment, the encoding quality of the image data is scaled for each region surrounding the region of interest based on a distance between each region and the region of interest.

The encoding module 219 of transmitting computer 100 locates the block of pixels located at the center of the region of interest ("ROI center") and calculates the distance between the ROI center and each block of pixels in the image. These distance values are then stored for later processing, as discussed below. The distance values may be stored in an array or a similar data structure.

Using the distance values, the transmitting computer 100 sets the quality value (Q value) for all blocks of pixels for the region of interest to Qmax, which was previously set in step 501. Accordingly, the entire region of interest is designated to be encoded at full image quality.

The encoding module 219 of transmitting computer 100 also sets the Q value for the block of pixels that is located furthest from the ROI center to Qmin, which was previously set in step 501. In other words, the block of pixels located furthest from the ROI center will be encoded at a reduced quality.

The encoding module 219 of transmitting computer 100 also generates Q values for all surrounding blocks of pixels located between the ROI center and the block of pixels located furthest from the ROI center. The Q value for each block of pixels is stored. The Q value may be stored in an array or a similar data structure.

Using the Q value for each block of pixels, the encoding module 219 of transmitting computer 100 determines a scale value for each block of pixels and stores the scale values for later processing. The scale values may be stored in an array or a similar data structure. This scale map is later transmitted to the receiving computer 200 to facilitate the decoding process, as discussed in greater detail in FIG. 6.

A formula is used to determine the scale value for each block of pixels, as shown below.

---

If (Q value(i, j) < 50)
   Scale(i, j) = 5000/ Q value(i, j)
Else
   Scale(i, j) = 200 − 2 × Q value(i, j)

---

In the formula above, the coordinates i, j represent the Q value or the Scale value associated with a particular block of pixels. According to the formula, blocks of pixels with a Q value less than 50 are given a Scale value of 5000/Q value(i, j), thereby reducing the quality for those blocks of pixels. Alternatively, blocks of pixels with a Q value exceeding 50 are given a Scale value of 200−2×Q value(i, j), thereby increasing the quality for those blocks of pixels.

In step 504, the encoding module 219 of transmitting computer 100 encodes the image data, where the encoded image data has a lower quality portion and a higher quality portion. Each block of pixels in the image is encoded into a bit sequence using a discrete cosine transform (DCT), which yields a block matrix consisting of 64 DCT coefficients. In addition, the block matrix is divided by the scale map generated in step 503 to produce a quantized block matrix consisting of 64 quantized coefficients for the block of pixels. Each block of pixels in the image is represented by 64 quantized coefficients. This process is repeated for each block of pixels in the image, for each Y', $C_B$ and $C_R$ color plane.

In other words, the encoding module 219 of transmitting computer 100 generates 64 quantized coefficients for each block of pixels three times, where one set of coefficients is generated for the Y' color plane, another set for the $C_B$ color plane, and another set for the $C_R$ color plane. These calculations are performed using the image data that was stored for the Y', $C_B$ and $C_R$ color planes in step 501. The three sets of quantized coefficients for each block of pixels are stored for later processing. As an example, the quantized coefficients may be stored in an array or a similar data structure.

The present disclosure also contemplates that the encoding step may be performed using other encoding methods as well.

In step 505, the transmitting computer 100 establishes a connection with the receiving computer 200. This connection may be initiated by the transmitting computer 100 or by the receiving computer 200. Once a connection is established, the data transmitting module 220 of transmitting computer 100 transmits image information, such as, image dimensions, the number of regions of interest that are being transmitted, and the image quality scale map.

The transmitted image information is used by the receiving computer 200 to decode and display the received image data. For example, the receiving computer 200 may use the image dimensions to allocate memory space for the incoming image data or to determine how much screen space to allocate in order to display the incoming image data. The image quality scale map is used to decode the image data, as discussed more fully in connection with FIG. 6. The number of regions of interest that were identified in the image is also transmitted by the transmitting computer 100, so that the receiving computer 200 can anticipate the number of regions of interest it should expect to receive from the transmitting computer 100.

In step 506, the identification module 218 of transmitting computer 100 identifies a block of pixels in the region of interest for transmission to the receiving computer 200.

According to this embodiment, the blocks of pixels are transmitted in an order starting from the center of the region of interest and spiraling outwardly toward edges of the region of interest.

As depicted in FIG. 7, the order of transmission for the blocks of pixels begins with the block of pixels located at the center of the region of interest ("ROI center") and proceeds in a spiraling pattern to the blocks located at the edges of the image.

In step 507, coordinates for the region of interest are transmitted from the transmitting computer 100 to the receiving computer 200. Specifically, the transmitting computer 100 transmits coordinates for the block of pixels for the region of interest that was identified in step 506. As an example, the transmitted coordinates may be x, y coordinates, where such coordinates respectively correspond to the horizontal and vertical addresses of the block of pixels being transmitted with respect to the original image.

In this embodiment, each block of pixels is encoded into a bit sequence wherein leading bits thereof comprise the lower quality portion and subsequent bits thereof comprise the higher quality portion.

Thus, in steps 508 and 509, the lower quality portion of the encoded image data for the region of interest is transmitted to the receiving computer 200 for decoding and display by the receiving computer 200 at a position corresponding to the transmitted coordinates for the region of interest.

In more detail, in step 508, the data transmitting module 220 of transmitting computer 100 transmits the block of pixels representing the lower quality portion of the encoded image for the region of interest. Referring back to step 504, each block of pixels is represented using 64 quantized coefficients, for each Y', $C_B$ and $C_R$ color plane. Thus, in order to transmit the block of pixels at a lower quality, the data transmitting module 220 of transmitting computer 100 transmits some of the 64 quantized coefficients for the block of pixels to the receiving computer 200. For example, data transmitting module 220 of transmitting computer 100 may transmit the first six quantized coefficients, i.e., coefficients 1 to 6, for each Y', $C_B$ and $C_R$ color plane.

The present disclosure also contemplates a different ordering for transmission of the coordinates and transmission of the encoded image data, and the present embodiments can be adapted to transmit the coordinates and the encoded image data in either order.

Thus, according to an alternative example embodiment, the encoded image data and the coordinates corresponding to the encoded image data are packaged into a data packet, one after the other, where the steps of transmitting coordinates and transmitting the image data are comprised by transmitting the data packet.

In step 509, the data transmitting module 220 of transmitting computer 100 transmits the block of pixels representing the lower quality portion of the encoded image data for the region of interest. Similar to the transmission step in step 508, the data transmitting module 220 of transmitting computer 100 transmits the block of pixels by transmitting another set of the 64 quantized coefficients for the block of pixels, where the set of coefficients further comprises the lower quality portion of the encoded image data for the region of interest. Continuing with the example presented in step 508, the data transmitting module 220 of transmitting computer 100 may transmit quantized coefficients 7 to 20, for each Y', $C_B$ and $C_R$ color plane.

In step 510, the data transmitting module 220 of transmitting computer 100 determines if additional blocks of pixels for the region of interest are to be transmitted. If all blocks of pixels for the region of interest have not been transmitted, the transmitting computer 100 proceeds to step 506 and identifies and transmits the next block of pixels within the region of interest, as described above. Otherwise, the transmitting computer 100 continues to step 511.

In step 511, the identification module 218 of transmitting computer 100 identifies a region surrounding the region of interest. In particular, the identification module 218 of transmitting computer 100 identifies the next region that is immediately adjacent to the region of interest, as depicted in FIG. 7.

In step 512, the identification module 218 of transmitting computer 100 identifies a block of pixels within the region surrounding the region of interest for transmission to the receiving computer 200.

As stated above, according to one embodiment, the blocks of pixels are transmitted in an order starting from the center of the region of interest and spiraling outwardly toward edges of the region of interest. The transmission order is described more fully below with respect to FIG. 7.

In step 513, coordinates for the region surrounding the region of interest are transmitted to the receiving computer 200. The data transmitting module 220 of transmitting computer 100 transmits the coordinates for the block of pixels for the region surrounding the region of interest that was identified in step 512. For example, the transmitted coordinates may be x, y coordinates, where such coordinates respectively correspond to the horizontal and vertical addresses of the block of pixels being transmitted with respect to the original image.

In step 514, after transmission of the lower quality portion of the encoded image data for the region of interest, the lower quality portion of the encoded image data for the region surrounding the region of interest is transmitted to the receiving computer 200 for decoding and display by the receiving computer 200 at a position corresponding to the transmitted coordinates for the region surrounding the region of interest.

In more detail, the data transmitting module 220 of transmitting computer 100 transmits the block of pixels representing the lower quality portion of the encoded image data for the region surrounding the region of interest. As discussed in step 508, each block of pixels is represented using 64 quantized coefficients, for each Y', $C_B$ and $C_R$ color plane. Thus, in order to transmit the block of pixels at a low quality, the data transmitting module 220 of transmitting computer 100 transmits some of the 64 quantized coefficients for the block of pixels to the receiving computer 200. For example, the data transmitting module 220 of transmitting computer 100 may transmit the first six quantized coefficients, i.e., coefficients 1 to 6, for each Y', $C_B$ and $C_R$ color plane.

In step 515, after transmission of the lower quality portion of the encoded image data for the region surrounding the region of interest, the higher quality portion of the encoded image data for the region of interest is transmitted for display by the receiving computer 200 at a position corresponding to the transmitted coordinates for the region of interest.

According to the embodiment described herein, the higher quality portion of the encoded image data for the region surrounding the region of interest is transmitted for decoding and display by the receiving computer 200 at a position corresponding to the transmitted coordinates for the region surrounding the region of interest.

In another example embodiment described herein, the transmission of the higher quality portion of the encoded image data for the region of interest and the region surrounding the region of interest is ordered so that the higher quality portion of the encoded image for the region surrounding the region of interest is transmitted before the higher quality portion of the encoded image data for the region of interest.

Accordingly, after transmission of the lower quality portion of the encoded image data for the region surrounding the region of interest, the higher quality portion of the encoded image data for the region surrounding the region of interest is transmitted for display by the receiving computer 200 at a position corresponding to the transmitted coordinates for the region surrounding the region of interest.

An alternate order of transmission for the higher quality portion of the encoded image data for the region of interest and the higher quality portion of the encoded image data for the region surrounding the region of interest may also be effected.

Thus, according to an alternative example embodiment, the transmission of the higher quality portion of the encoded image data for the region of interest and the region surrounding the region of interest is ordered so that the higher quality portion of the encoded image for the region of interest is transmitted before the higher quality portion of the encoded image data for the region surrounding the region of interest.

In more detail, the data transmitting module 220 of transmitting computer 100 transmits the block of pixels for the higher quality portion of the encoded image data for the region surrounding the region of interest. For example, the data transmitting module 220 of transmitting computer 100 may transmit the block of pixels at a higher quality by transmitting the remaining coefficients of the 64 quantized coefficients for the block of pixels. Continuing with the example presented in step 514, the data transmitting module 220 of transmitting computer 100 may transmit quantized coefficients 7 to 64, for each Y', $C_B$ and $C_R$ color plane.

In step 516, the data transmitting module 220 of transmitting computer 100 determines if additional blocks of pixels for the region surrounding the region of interest are to be transmitted. If all blocks of pixels for the region surrounding the region of interest have not been transmitted, the transmitting computer 100 proceeds to step 512 and identifies and transmits the next block of pixels within the region surrounding the region of interest, as described above. Otherwise, the transmitting computer 100 continues to step 517.

Accordingly, in step 517, the data transmitting module 220 of transmitting computer 100 determines if additional regions surrounding the region of interest are to be transmitted. If all regions surrounding the region of interest have not been transmitted, the transmitting computer 100 proceeds to step 511, where another region surrounding the region of interest is identified. Otherwise, the transmitting computer 100 continues to step 518.

In step 518, the transmitting computer 100 identifies a block of pixels within the region of interest for transmission to the receiving computer 200.

In step 519, coordinates for the region of interest are transmitted from the transmitting computer 100 to the receiving computer 200.

In step 520, the higher quality portion of the encoded image data for the region of interest is transmitted for decoding and display by the receiving computer 200 at a position corresponding to the transmitted coordinates for the region of interest.

In more detail, the data transmitting module 220 of transmitting computer 100 transmits the block of pixels representing the higher quality portion of the encoded image data for the region of interest. Referring back to step 504, each block of pixels is represented using 64 quantized coefficients, for each Y', $C_B$ and $C_R$ color plane. Thus, in order to transmit the remaining image data for the block of pixels, the data transmitting module 220 of transmitting computer 100 transmits the remaining quantized coefficients to the receiving computer 200. Continuing with the example presented in step 509, the data transmitting module 220 of transmitting computer 100 transmits coefficients 21 to 64, for each Y', $C_B$ and $C_R$ color plane. At this point, the region of interest has been transmitted at the highest quality it was encoded at in step 504.

According to one example embodiment, the transmission of lower quality portion of the encoded image data and the higher quality portion of the encoded image data comprises a lossless transmission of the image data.

In step 521, the data transmitting module 220 of transmitting computer 100 determines if additional blocks of pixels for the region of interest are to be transmitted. If all blocks of pixels for the region of interest have not been transmitted, the transmitting computer 100 proceeds to step 518 and identifies and transmits the next block of pixels within the region of interest, as described above. Otherwise, the transmitting computer 100 ends the transmission process.

Figure 6:
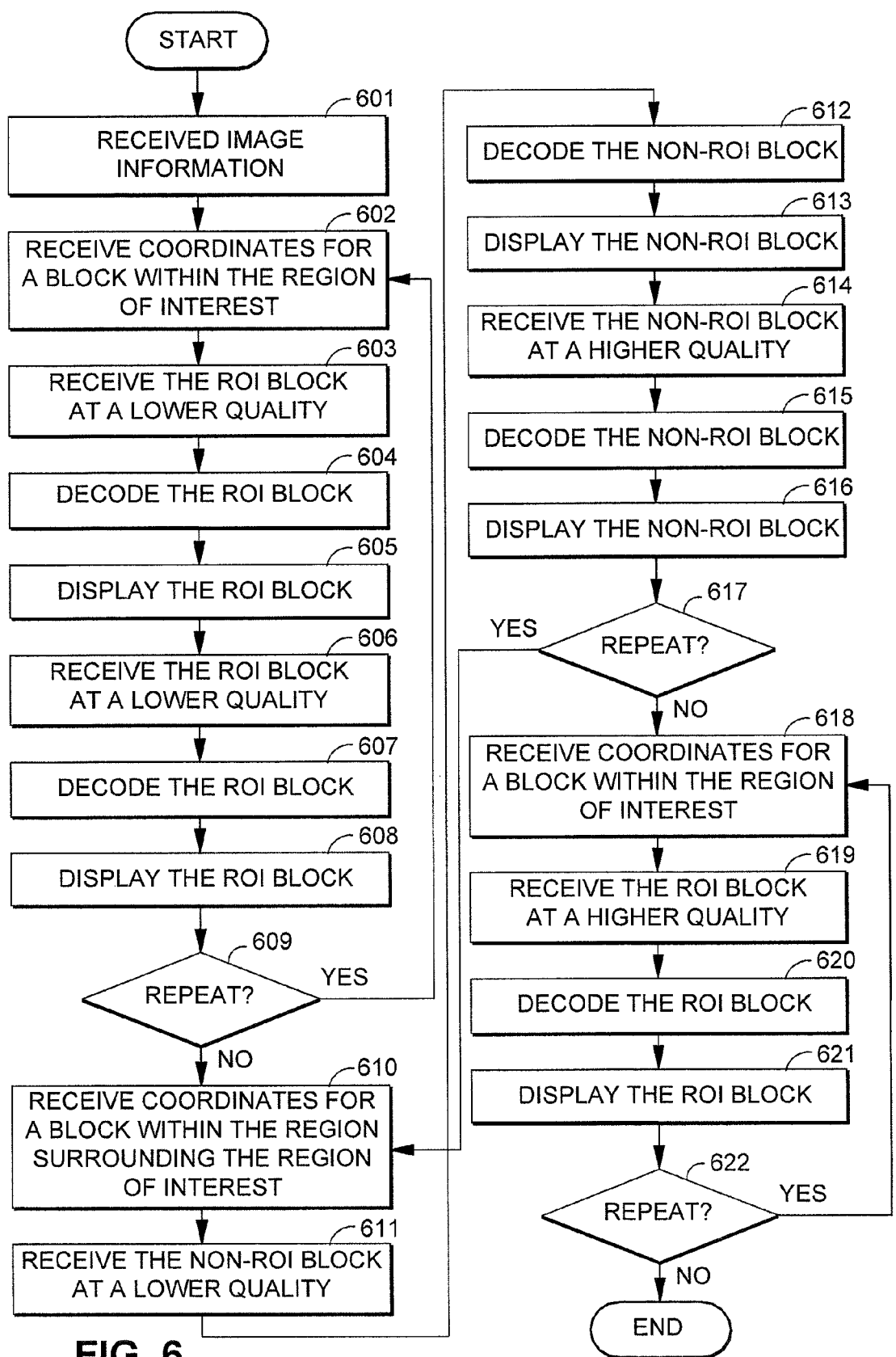
FIG. 6 is a flowchart illustrating an example process for the image reception process.

FIG. 6 is a flowchart illustrating an example process for the image reception process.

Briefly, in FIG. 6, image data is received from a first computer at a second computer over a network. In this regard, coordinates for the region of interest are received from the first computer at the second computer. A lower quality portion of the encoded image data for the region of interest is received. The lower quality portion of the encoded image data for the region of interest is decoded. The decoded lower quality portion of the encoded image data for the region of interest is displayed at a position corresponding to the received coordinates for the region of interest.

According to this embodiment, coordinates for the region surrounding the region of interest are received from the first computer at the second computer. After reception of the lower quality portion of the encoded image data for the region of interest, a lower quality portion of the encoded image data for the region surrounding the region of interest is received. The lower quality portion of the encoded image data for the region surrounding the region of interest is decoded. The decoded lower quality portion of the encoded image data for the region surrounding the region of interest is displayed at a position corresponding to the received coordinates for the region surrounding the region of interest.

Further to this embodiment, a higher quality portion of the encoded image data for the region of interest is received. The higher quality portion of the encoded image data for the region of interest is decoded. The decoded higher quality portion of the encoded image data for the region of interest is displayed at a position corresponding to the received coordinates for the region of interest, where the decoded higher quality portion for the region of interest is displayed after display of the decoded lower quality portion for the region surrounding the region of interest.

In more detail, the process in the receiving computer 200 starts in step 601, where image information is received by data receiving module 316. The image information includes data to facilitate decoding and displaying the incoming image data, such as, image dimensions, the number of regions of interest that are being transmitted, and the image quality scale map.

For example, the receiving computer 200 may use the image dimensions to allocate memory space for the incoming image data, or to determine how much screen space to allocate in order to display the incoming image data. The image quality scale map is used to decode the image data, as discussed more fully in step 604. The number of regions of interest that are being transmitted may be received to allow the receiving computer 200 to anticipate the number of regions of interest it should expect to receive.

In steps 602 to 608, image data is received from transmitting computer 100 at receiving computer 200 over a network. Coordinates for the region of interest are received from the transmitting computer 100 at the receiving computer 200. In particular, image data for the lower quality portion of the encoded image data for the region of interest is received for display by the receiving computer 200 at a position corresponding to the transmitted coordinates for the region of interest. The lower quality portion of the encoded image data for the region of interest is decoded. The decoded lower quality portion of the encoded image data for the region of interest is displayed at a position corresponding to the received coordinates for the region of interest.

In step 602, coordinates for the region of interest are received from the transmitting computer 100 at the receiving computer 200.

In the embodiment described herein, the region of interest and the region surrounding the region of interest are comprised of blocks of pixels, where the steps of receiving, decoding, and displaying are performed on the blocks of pixels.

The data receiving module 316 of receiving computer 200 receives the coordinates for a block of pixels located within the region of interest. As an example, the received coordinates may be x, y coordinates, where such coordinates respectively correspond to the horizontal and vertical addresses of the block of pixels being received, with respect to the original image. Accordingly, the receiving computer 200 uses the x, y coordinates to plot the block of pixels on the display screen 201.

According to the embodiment described herein, each block of pixels is encoded into a bit sequence wherein leading bits thereof comprise the lower quality portion and subsequent bits thereof comprise the higher quality portion.

Thus, in step 603, the lower quality portion of the encoded image data for the region of interest is received for display by the data receiving module 316 of receiving computer 200 at a position corresponding to the transmitted coordinates for the region of interest.

In more detail, the data receiving module 316 of receiving computer 200 receives the block of pixels for which coordinates were received, where the block of pixels comprises the lower quality portion of the encoded image data for the region of interest. As discussed in step 508, the data transmitting module 220 of transmitting computer 100 transmits some of the 64 quantized coefficients for the block of pixels to the receiving computer 200 for each Y', $C_B$ and $C_R$ color plane. Accordingly, the data receiving module 316 of receiving computer 200 may receive the first six quantized coefficients, i.e., coefficients 1 to 6, for each Y', $C_B$ and $C_R$ color plane for the block of pixels for the region of interest.

In one example embodiment, the image data and the coordinates corresponding to the image data may be received as a data packet where the data packet is unpackaged to retrieve the image data and the coordinates corresponding to the image data, and where the steps of receiving the image data and the coordinates corresponding to the image data are comprised by receiving the data packet.

In step 604, the lower quality portion of the encoded image data for the region of interest is decoded.

The coefficients received for the block of pixels for the region of interest is decoded by decoding module 317 of receiving computer 200 using an inverse discrete cosine transform (DCT). These coefficients are also manipulated using matrix multiplication operations performed against the image quality scale map that was received in step 601. This process is done for each coefficient in each Y', $C_B$ and $C_R$ color plane. As a result of these operations, a decoded block of pixels for the region of interest is produced for each Y', $C_B$ and $C_R$ color plane.

The receiving computer performs additional operations to convert the decoded block of pixels for each Y', $C_B$ and $C_R$ color plane back to the RGB color space. As a result, the block of pixels decoded and converted to RGB color space.

In step 605, the decoded lower quality portion of the encoded image data for the region of interest is displayed at a position corresponding to the received coordinates for the region of interest. More specifically, the display module 318 of receiving computer 200 plots the decoded block of pixels in the RGB color space at a position corresponding to the display coordinates that were received in step 602.

In step 606, the lower quality portion of the encoded image data for the region of interest is received for display by the data receiving module 316 of receiving computer 200 at a position corresponding to the transmitted coordinates for the region of interest.

In more detail, the data receiving module 316 of receiving computer 200 receives the block of pixels for which coordinates were received, where the block of pixels comprises the lower quality portion of the encoded image data for the region of interest. Similar to the reception step in step 603, the data receiving module 316 of receiving computer 200 receives another set of the 64 quantized coefficients for the block of pixels, where the set of coefficients further comprises the lower quality portion of the encoded image data for the region of interest. Continuing with the example presented in step 603, the data receiving module 316 of receiving computer 200 may receive quantized coefficients 7 to 20, for each Y', $C_B$ and $C_R$ color plane.

In step 607, the lower quality portion of the encoded image data for the region of interest is decoded, as discussed in step 604. As a result, the block of pixels decoded and converted to RGB color space.

In step 608, the decoded lower quality portion of the encoded image data for the region of interest is displayed at a position corresponding to the received coordinates for the region of interest, as discussed in step 605.

In step 609, the data receiving module 316 of receiving computer 200 determines if additional blocks of pixels for the region of interest are to be received. If all blocks of pixels for the region of interest have not been received, the receiving computer 200 proceeds to step 602 and receives the next block of pixels within the region of interest, as described above. Otherwise, the receiving computer 200 continues to step 610.

In step 610, coordinates for the region surrounding the region of interest are received from the transmitting computer 100 at the receiving computer 200. In particular, the data receiving module 316 of receiving computer 200 receives the coordinates for a block of pixels within the region surrounding the region of interest.

In step 611, after reception of the lower quality portion of the encoded image data for the region of interest, a lower quality portion of the encoded image data for the region surrounding the region of interest is received for display by display module 318 of receiving computer 200 at a position corresponding to the received coordinates for the region surrounding the region of interest.

In more detail, the data receiving module 316 of receiving computer 200 receives the block of pixels for which coordinates were received, where the block of pixels comprises the lower quality portion of the encoded image data for the region surrounding the region of interest. As discussed in step 508, the data transmitting module 220 of transmitting computer 100 transmits some of the 64 quantized coefficients for the block of pixels to the receiving computer 200 for each Y', $C_B$ and $C_R$ color plane. Accordingly, the data receiving module 316 of receiving computer 200 may receive the first six quantized coefficients, i.e., coefficients 1 to 6, for each Y', $C_B$ and $C_R$ color plane for the block of pixels for the region surrounding the region of interest.

In step 612, the lower quality portion of the encoded image data for the region surrounding the region of interest is decoded, as discussed in step 604. As a result, the block of pixels decoded and converted to RGB color space.

In step 613, the decoded lower quality portion of the encoded image data for the region surrounding the region of interest is displayed at a position corresponding to the received coordinates for the region surrounding the region of interest, as discussed in step 605.

In step 614, a higher quality portion of the encoded image data for the region of interest is received for display by the display module 318 of receiving computer 200 at a position corresponding to the transmitted coordinates for the region surrounding the region of interest, where the decoded higher quality portion for the region of interest is displayed after display of the decoded lower quality portion for the region surrounding the region of interest.

According to one example embodiment described herein, a higher quality portion of the encoded image data for the region surrounding the region of interest is received, decoded, and displayed at a position corresponding to the received coordinates for the region surrounding region of interest.

In another example embodiment, the reception of the higher quality portion of the encoded image data for the region of interest and the region surrounding the region of interest is ordered so that the higher quality portion of the encoded image for the region surrounding the region of interest is received before the higher quality portion of the encoded image data for the region of interest.

Accordingly, the data receiving module 316 of receiving computer 200 receives the block of pixels for the region surrounding the region of interest at a higher quality. The data receiving module 316 of receiving computer 200 receives the block of pixels at a higher quality by receiving another set of the 64 quantized coefficients. Continuing with the example presented in step 611, the data receiving module 316 of receiving computer 200 receives quantized coefficients 7 to 64, for each Y', $C_B$ and $C_R$ color plane. At this point, the block of pixels for the region surrounding the region of interest has been received in the highest quality it was encoded at by the encoding module 219 of transmitting computer 100.

The present disclosure contemplates a different order of reception for the higher quality portion of the encoded image data for the region of interest and the region surrounding the region of interest, and the present embodiments can be adapted to order the reception in any order.

Thus, in an alternative example embodiment, the reception of the higher quality portion of the encoded image data for the region of interest and the region surrounding the region of interest is ordered so that the higher quality portion of the encoded image for the region of interest is received before the higher quality portion of the encoded image data for the region surrounding the region of interest.

In step 615, the higher quality portion of the encoded image data for the region surrounding the region of interest is decoded, as discussed in step 604. As a result, the block of pixels is decoded and converted to RGB color space.

In step 616, the decoded higher quality portion of the encoded image data for the region surrounding the region of interest is displayed at a position corresponding to the received coordinates for the region surrounding the region of interest, as discussed in step 605.

Accordingly, in step 617, the data receiving module 316 of receiving computer 200 determines if additional blocks of pixels for the region surrounding the region of interest are to be received. If all blocks of pixels for the region surrounding the region of interest have not been received, the receiving computer 200 proceeds to step 610 and receives the next block of pixels a region surrounding the region of interest, as described above. Otherwise, the receiving computer 200 continues to step 618.

In step 618, coordinates for the region of interest are received from the transmitting computer 100 at the receiving computer 200. In particular, the data receiving module 316 of receiving computer 200 receives the coordinates for a block of pixels within the region of interest.

In step 619, the higher quality portion of the encoded image data for the region of interest is received for display by the display module 318 of receiving computer 200 at a position corresponding to the transmitted coordinates for the region of interest.

In more detail, the data receiving module 316 of receiving computer 200 receives the block of pixels for the region of interest at a higher quality. The data receiving module 316 of receiving computer 200 receives the block of pixels at a higher quality by receiving another set of the 64 quantized coefficients. Continuing with the example presented in step 606, the data receiving module 316 of receiving computer 200 may receive quantized coefficients 20 to 64, for each Y', $C_B$ and $C_R$ color plane. At this point, the block of pixels for the region of interest has been received in the highest quality it was encoded at by the encoding module 219 of transmitting computer 100.

In step 620, the higher quality portion of the encoded image data for the region of interest is decoded, as discussed in step 604. As a result, the block of pixels is decoded and converted to RGB color space.

In step 621, the decoded higher quality portion of the encoded image data for the region of interest is displayed at a position corresponding to the received coordinates for the region surrounding the region of interest, as discussed in step 605.

In step 622, the data receiving module 316 of receiving computer 200 determines if additional blocks of pixels for the region of interest are to be received. If all blocks of pixels for the region of interest have not been received, the receiving computer 200 proceeds to step 618 and receives the next block of pixels within the region of interest, as described above. Otherwise, the receiving computer 200 ends the receiving process.

FIG. 7 is a view for explaining an example transmission order for image data where the image data is comprised of blocks of pixels.

FIG. 7 depicts the region of interest and the region surrounding the region of interest as being comprised of blocks of pixels, as indicated by the numbered boxes. The region of interest 701, as depicted by the shaded area, is transmitted in an order starting from the center of the region of interest, i.e., ROI center, and spiraling outwardly toward the edges of the image.

In this example, the transmission order begins with the block of pixels labeled "ROI center", followed by the shaded block labeled "1", followed by the shaded block labeled "2", and proceeding onwards in a spiraling direction, up to the shaded block labeled "8".

Upon transmission of the region of interest 701, the region surrounding the region of interest 702 is transmitted in a similar fashion, beginning with the unshaded block labeled "1", followed by the unshaded block labeled "2", and proceeding onwards in a spiraling direction, up to the unshaded block labeled "16".

Figure 8:
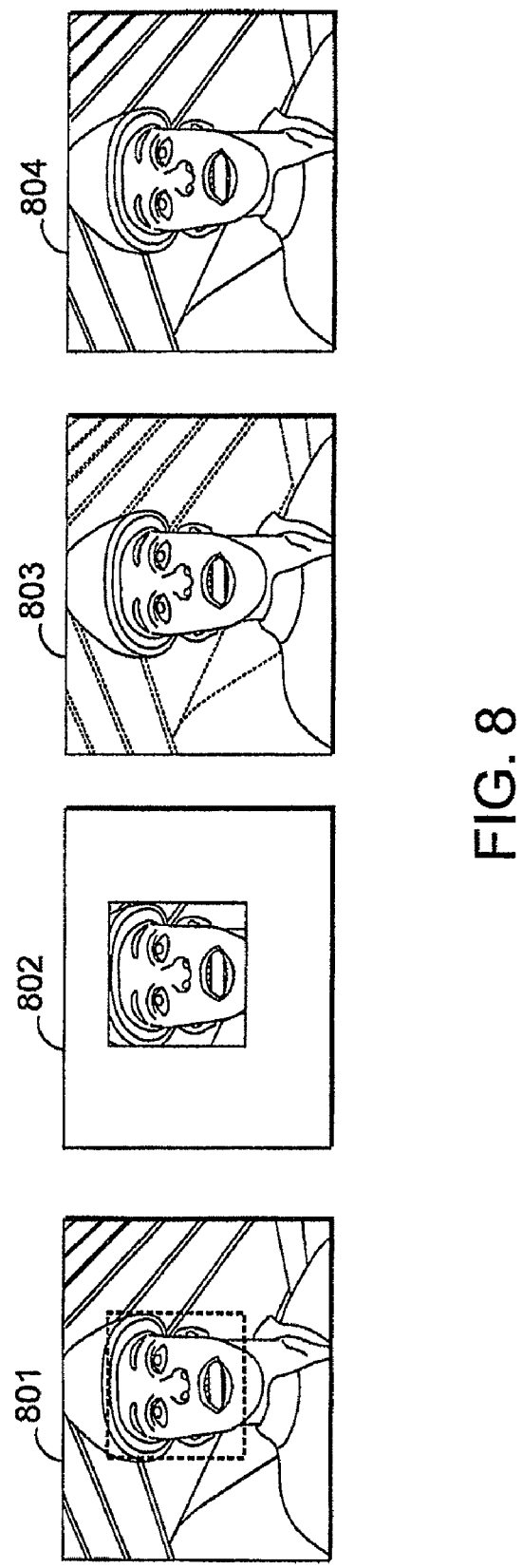
FIG. 8 illustrates an example execution of the transmission operation for an image containing a region of interest.

FIG. 8 illustrates an example execution of the transmission operation for an image containing a region of interest.

In step 801, the encoding module 219 of transmitting computer 100 encodes the image data, where the encoded image data has a lower quality portion and a higher quality portion and identifies a region of interest in the image, where the region of interest is identified by the identification module 218 of transmitting computer 100 using face detection calculations on the image data, as indicated by the dotted lines.

In step 802, the data transmitting module 220 of transmitting computer 100 transmits coordinates for the region of interest and transmits the lower quality portion of the encoded image data for the region of interest for display at a position corresponding to the transmitted coordinates for the region of interest. Accordingly, the region of interest is in a lower quality.

In step 803, the identification module 218 of transmitting computer 100 identifies a region surrounding the region of interest and transmits coordinates for the region surrounding the region of interest. In particular, after transmission of the lower quality portion of the encoded image data for the region of interest, the transmitting computer transmits the lower quality portion of the encoded image data for the region surrounding the region of interest for display at a position corresponding to the transmitted coordinates for the region surrounding the region of interest. The region surrounding the region of interest is now displayed in a lower quality.

In step 804, after transmission of the lower quality portion of the encoded image data for the region surrounding the region of interest, the data transmitting module 220 of transmitting computer 100 transmits the higher quality portion of the encoded image data for the region of interest for display at a position corresponding to the transmitted coordinates for the region of interest.

The transmitting computer also transmits the higher quality portion of the encoded image data for the region surrounding the region of interest for decoding and display by the receiving computer 200 at a position corresponding to the transmitted coordinates for the region surrounding the region of interest.

In this example, the transmission of the higher quality portion of the encoded image data for the region of interest and the region surrounding the region of interest is ordered so that the higher quality portion of the encoded image for the region surrounding the region of interest is transmitted before the higher quality portion of the encoded image data for the region of interest.

Accordingly, in the example shown, both the region of interest and the region surrounding the region of interest are depicted in a higher quality. The image is now fully transmitted.

Figure 9:
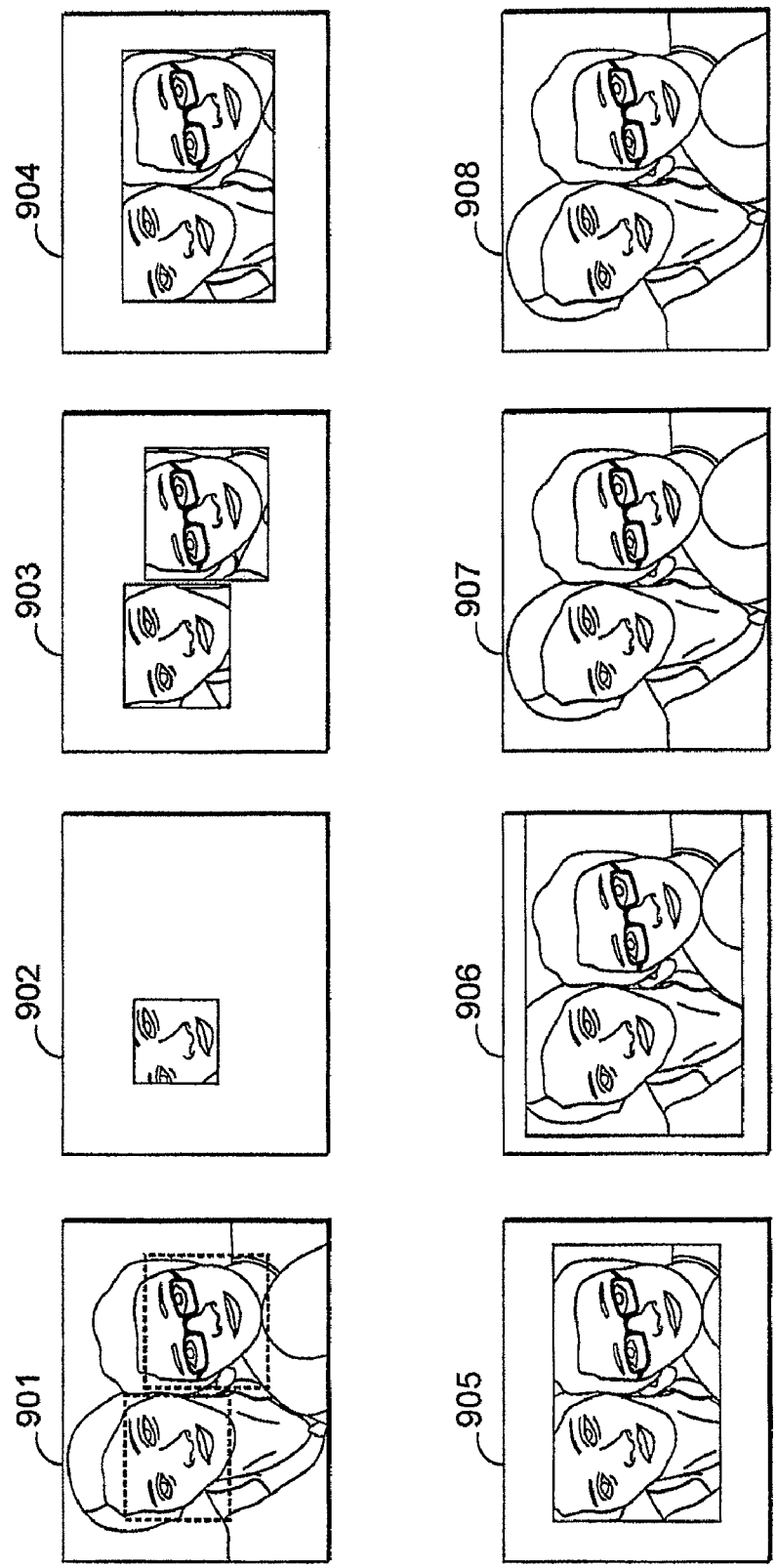
FIG. 9 illustrates an example execution of the transmission operation for an image containing multiple regions of interest.

FIG. 9 illustrates an example execution of the transmission operation for an image containing multiple regions of interest.

In step 901, the encoding module 219 of transmitting computer 100 encodes the image data, where the encoded image data has a lower quality portion and a higher quality portion and identifies regions of interest in the image using face detection calculations on the image data, as indicated by the dotted lines.

In step 902, the data transmitting module 220 of transmitting computer 100 transmits coordinates for a region of interest and transmits the lower quality portion of the encoded image data for the region of interest for display at a position corresponding to the transmitted coordinates for the region of interest.

In step 903, the data transmitting module 220 of transmitting computer 100 transmits another region of interest by transmitting coordinates for the region of interest and transmitting the lower quality portion of the encoded image data for the region of interest for display at a position corresponding to the transmitted coordinates for the region of interest. Accordingly, both regions of interest are depicted as being transmitted in a lower quality.

In step 904, the identification module 218 of transmitting computer 100 identifies a region surrounding the region of interest and transmits coordinates for the region surrounding the region of interest. In particular, after transmission of the lower quality portion of the encoded image data for the region of interest, the transmitting computer transmits the lower quality portion of the encoded image data for the region surrounding the region of interest for display at a position corresponding to the transmitted coordinates for the region surrounding the region of interest. As a result, a region surrounding both regions of interest is now depicted.

Accordingly, in steps 905 to 906, the transmitting computer 100 repeats the steps of identifying a region surrounding the region of interest, transmitting coordinates for the region surrounding the region of interest, transmitting the lower quality portion of the encoded image data for the region surrounding the region of interest, and transmitting the higher quality portion of the encoded image data for the region surrounding the region of interest; for each subsequent region surrounding the region of interest until encoded image data for an entirety of the image is transmitted. In this regard, steps 905 to 906 show a progression in the region surrounding the regions of interest.

In step 907, after transmission of the lower quality portion of the encoded image data for the region surrounding the region of interest, the data transmitting module 220 of transmitting computer 100 transmits the higher quality portion of the encoded image data for the region of interest for display at a position corresponding to the transmitted coordinates for the region of interest.

The data transmitting module 220 of transmitting computer 100 also transmits the higher quality portion of the encoded image data for the region surrounding the region of interest for decoding and display by the receiving computer 200 at a position corresponding to the transmitted coordinates for the region surrounding the region of interest.

In this example, the transmission of the higher quality portion of the encoded image data for the region of interest and the region surrounding the region of interest is ordered so that the higher quality portion of the encoded image for the region surrounding the region of interest is transmitted before the higher quality portion of the encoded image data for the region of interest.

Accordingly, in the example shown, the region surrounding the region of interest is depicted in a higher quality.

In step 908, the data transmitting module 220 of transmitting computer 100 has transmitted the higher quality portion of the encoded image data for the region of interest for display at a position corresponding to the transmitted coordinates for the region of interest. Accordingly, both regions of interest and the region surrounding the region of interest are depicted in a higher quality. The image is now fully transmitted.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for transmitting image data of an image from a first computer to a second computer over a network, wherein the method comprises:

encoding the image data, wherein the encoded image data has a lower quality portion and a higher quality portion;

identifying a region of interest in the image by the first computer, wherein the first computer identifies the region of interest by calculations using the image data;

transmitting coordinates for the region of interest from the first computer to the second computer;
transmitting the lower quality portion of the encoded image data for the region of interest to the second computer for decoding and display by the second computer at a position corresponding to the transmitted coordinates for the region of interest;
identifying a region surrounding the region of interest by the first computer;
transmitting coordinates for the region surrounding the region of interest to the second computer;
after transmission of the lower quality portion of the encoded image data for the region of interest, transmitting the lower quality portion of the encoded image data for the region surrounding the region of interest to the second computer for decoding and display by the second computer at a position corresponding to the transmitted coordinates for the region surrounding the region of interest; and
after transmission of the lower quality portion of the encoded image data for the region surrounding the region of interest, transmitting the higher quality portion of the encoded image data for the region of interest for decoding and display by the second computer at a position corresponding to the transmitted coordinates for the region of interest.

2. A method according to claim 1, further comprising the step of transmitting the higher quality portion of the encoded image data for the region surrounding the region of interest for decoding and display by the second computer at a position corresponding to the transmitted coordinates for the region surrounding the region of interest.

3. A method according to claim 2, wherein the transmission of the higher quality portion of the encoded image data for the region of interest and the region surrounding the region of interest is ordered so that the higher quality portion of the encoded image for the region of interest is transmitted before the higher quality portion of the encoded image data for the region surrounding the region of interest.

4. A method according to claim 2, wherein the transmission of the higher quality portion of the encoded image data for the region of interest and the region surrounding the region of interest is ordered so that the higher quality portion of the encoded image for the region surrounding the region of interest is transmitted before the higher quality portion of the encoded image data for the region of interest.

5. A method according to claim 1, wherein the region of interest and the region surrounding the region of interest are comprised of blocks of pixels, and wherein the step of transmitting is performed on the blocks of pixels.

6. A method according to claim 5, wherein the blocks of pixels are transmitted in an order starting from the center of the region of interest and spiraling outwardly toward edges of the region of interest.

7. A method according to claim 5, wherein each block of pixels is encoded into a bit sequence wherein leading bits thereof comprise the lower quality portion and subsequent bits thereof comprise the higher quality portion.

8. A method according to claim 1, wherein the encoding quality of the region of interest and the region surrounding the region of interest is adjusted depending on limitations imposed by a user or the network.

9. A method according to claim 1, wherein the encoding quality of the image data is scaled for each region surrounding the region of interest based on a distance between each region and the region of interest.

10. A method according to claim 1, wherein the transmission of lower quality portion of the encoded image data and the higher quality portion of the encoded image data comprises a lossless transmission of the image data.

11. A method according to claim 1, further comprising packaging of the encoded image data and the coordinates corresponding to the encoded image data into a data packet, one after the other, wherein the steps of transmitting coordinates and transmitting the image data are comprised by transmitting the data packet.

12. A method according to claim 1, wherein the identification of the region of interest uses edge detection calculations on the image data.

13. A method according to claim 1, wherein the identification of the region of interest uses spatial frequency calculations on the image data.

14. A method according to claim 1, wherein the identification of the region of interest uses face detection calculations on the image data.

15. A method according to claim 1, wherein the identification of the region of interest incorporates machine learning techniques, wherein the machine learning techniques analyze samples of image data, and wherein the region of interest is identified based on patterns uncovered from analyzing the samples of image data.

16. A method according to claim 1, wherein the identification of the region of interest incorporates data mining techniques, wherein the data mining techniques analyze samples of image data, and wherein the region of interest is identified based on patterns uncovered from analyzing the samples of image data.

17. A method according to claim 1, wherein the identification of the region of interest uses metadata for the image data, wherein the metadata for the image data provides image content information for the image data, and wherein the region of interest is identified based on the image content information for the image data.

18. A method according to claim 1, wherein the identification of the region of interest uses block recognition techniques on the image data.

19. An image processing apparatus, comprising:
a computer-readable memory constructed to store computer-executable process steps; and
a processor constructed to execute the computer-executable process steps stored in the memory;
wherein the process steps stored in the memory cause the processor to transmit image data of an image from a first computer to a second computer over a network, and wherein the process steps include computer-executable process steps to:
encode the image data, wherein the encoded image data has a lower quality portion and a higher quality portion;
identify a region of interest in the image by the first computer, wherein the first computer identifies the region of interest by calculations using the image data;
transmit coordinates for the region of interest from the first computer to the second computer;
transmit the lower quality portion of the encoded image data for the region of interest to the second computer for decoding and display by the second computer at a position corresponding to the transmitted coordinates for the region of interest;
identify a region surrounding the region of interest by the first computer;
transmit coordinates for the region surrounding the region of interest to the second computer;

after transmission of the lower quality portion of the encoded image data for the region of interest, transmit the lower quality portion of the encoded image data for the region surrounding the region of interest to the second computer for decoding and display by the second computer at a position corresponding to the transmitted coordinates for the region surrounding the region of interest; and after transmission of the lower quality portion of the encoded image data for the region surrounding the region of interest, transmit the higher quality portion of the encoded image data for the region of interest for decoding and display by the second computer at a position corresponding to the transmitted coordinates for the region of interest.

20. An apparatus according to claim 19, further comprising the step of transmitting the higher quality portion of the encoded image data for the region surrounding the region of interest for decoding and display by the second computer at a position corresponding to the transmitted coordinates for the region surrounding the region of interest.

21. An apparatus according to claim 20, wherein the transmission of the higher quality portion of the encoded image data for the region of interest and the region surrounding the region of interest is ordered so that the higher quality portion of the encoded image for the region of interest is transmitted before the higher quality portion of the encoded image data for the region surrounding the region of interest.

22. An apparatus according to claim 20, wherein the transmission of the higher quality portion of the encoded image data for the region of interest and the region surrounding the region of interest is ordered so that the higher quality portion of the encoded image for the region surrounding the region of interest is transmitted before the higher quality portion of the encoded image data for the region of interest.

23. An apparatus according to claim 19, wherein the region of interest and the region surrounding the region of interest are comprised of blocks of pixels, and wherein the step of transmitting is performed on the blocks of pixels.

24. An apparatus according to claim 23, wherein the blocks of pixels are transmitted in an order starting from the center of the region of interest and spiraling outwardly toward edges of the region of interest.

25. An apparatus according to claim 23, wherein each block of pixels is encoded into a bit sequence wherein leading bits thereof comprise the lower quality portion and subsequent bits thereof comprise the higher quality portion.

26. An apparatus according to claim 19, wherein the encoding quality of the region of interest and the region surrounding the region of interest is adjusted depending on limitations imposed by a user or the network.

27. An apparatus according to claim 19, wherein the encoding quality of the image data is scaled for each region surrounding the region of interest based on a distance between each region and the region of interest.

28. An apparatus according to claim 19, wherein the transmission of lower quality portion of the encoded image data and the higher quality portion of the encoded image data comprises a lossless transmission of the image data.

29. An apparatus according to claim 19, further comprising packaging of the encoded image data and the coordinates corresponding to the encoded image data into a data packet, one after the other, wherein the steps of transmitting coordinates and transmitting the image data are comprised by transmitting the data packet.

30. An apparatus according to claim 19, wherein the identification of the region of interest uses edge detection calculations on the image data.

31. An apparatus according to claim 19, wherein the identification of the region of interest uses spatial frequency calculations on the image data.

32. An apparatus according to claim 19, wherein the identification of the region of interest uses face detection calculations on the image data.

33. An apparatus according to claim 19, wherein the identification of the region of interest incorporates machine learning techniques, wherein the machine learning techniques analyze samples of image data, and wherein the region of interest is identified based on patterns uncovered from analyzing the samples of image data.

34. An apparatus according to claim 19, wherein the identification of the region of interest incorporates data mining techniques, wherein the data mining techniques analyze samples of image data, and wherein the region of interest is identified based on patterns uncovered from analyzing the samples of image data.

35. An apparatus according to claim 19, wherein the identification of the region of interest uses metadata for the image data, wherein the metadata for the image data provides image content information for the image data, and wherein the region of interest is identified based on the image content information for the image data.

36. An apparatus according to claim 19, wherein the identification of the region of interest uses block recognition techniques on the image data.

37. A method for receiving image data of an image from a first computer at a second computer over a network, wherein the method comprises:
    receiving coordinates for a region of interest from the first computer at the second computer;
    receiving a lower quality portion of encoded image data for the region of interest;
    decoding the lower quality portion of the encoded image data for the region of interest;
    displaying the decoded lower quality portion of the encoded image data for the region of interest at a position corresponding to the received coordinates for the region of interest;
    receiving coordinates for a region surrounding the region of interest at the second computer;
    after reception of the lower quality portion of the encoded image data for the region of interest, receiving a lower quality portion of encoded image data for the region surrounding the region of interest;
    decoding the lower quality portion of the encoded image data for the region surrounding the region of interest;
    displaying the decoded lower quality portion of the encoded image data for the region surrounding the region of interest at a position corresponding to the received coordinates for the region surrounding the region of interest;
    receiving a higher quality portion of the encoded image data for the region of interest;
    decoding the higher quality portion of the encoded image data for the region of interest;
    displaying the decoded higher quality portion of the encoded image data for the region of interest at a position corresponding to the received coordinates for the region of interest, wherein the decoded higher quality portion for the region of interest is displayed after display of the decoded lower quality portion for the region surrounding the region of interest.

38. A method according to claim 37, further comprising the steps of receiving the higher quality portion of the encoded image data for the region surrounding the region of interest, decoding the higher quality portion of the encoded image data for the region surrounding the region of interest, and displaying the decoded higher quality portion of the encoded image data for the region surrounding the region of interest at a position corresponding to the received coordinates for the region surrounding region of interest.

39. A method according to claim 38, wherein the reception of the higher quality portion of the encoded image data for the region of interest and the region surrounding the region of interest is ordered so that the higher quality portion of the encoded image for the region of interest is received before the higher quality portion of the encoded image data for the region surrounding the region of interest.

40. A method according to claim 38, wherein the reception of the higher quality portion of the encoded image data for the region of interest and the region surrounding the region of interest is ordered so that the higher quality portion of the encoded image for the region surrounding the region of interest is received before the higher quality portion of the encoded image data for the region of interest.

41. A method according to claim 37, wherein the region of interest and the region surrounding the region of interest are comprised of blocks of pixels, and wherein the step of receiving is performed on the blocks of pixels.

42. A method according to claim 41, wherein the blocks of pixels are received in an order starting from the center of the region of interest and spiraling outwardly toward edges of the region of interest.

43. A method according to claim 37, further comprising receiving the image data and the coordinates corresponding to the image data as a data packet and unpackaging the data packet to retrieve the image data and the coordinates corresponding to the image data, wherein the steps of receiving the image data and the coordinates corresponding to the image data are comprised by receiving the data packet.

44. A method according to claim 37, wherein the region of interest is identified by the first computer by calculations using the image data.

45. An image processing apparatus, comprising:
a computer-readable memory constructed to store computer-executable process steps; and
a processor constructed to execute the computer-executable process steps stored in the memory;
wherein the process steps stored in the memory cause the processor to receive image data of an image from a first computer at a second computer over a network, and wherein the process steps include computer-executable process steps to:
receive coordinates for a region of interest from the first computer at the second computer;
receive a lower quality portion of encoded image data for the region of interest;
decode the lower quality portion of the encoded image data for the region of interest;
display the decoded lower quality portion of the encoded image data for the region of interest at a position corresponding to the received coordinates for the region of interest;
receive coordinates for a region surrounding the region of interest at the second computer;
after reception of the lower quality portion of the encoded image data for the region of interest, receive a lower quality portion of encoded image data for the region surrounding the region of interest;
decode the lower quality portion of the encoded image data for the region surrounding the region of interest;
display the decoded lower quality portion of the encoded image data for the region surrounding the region of interest at a position corresponding to the received coordinates for the region surrounding the region of interest;
receive a higher quality portion of the encoded image data for the region of interest;
decode the higher quality portion of the encoded image data for the region of interest;
display the decoded higher quality portion of the encoded image data for the region of interest at a position corresponding to the received coordinates for the region of interest, wherein the decoded higher quality portion for the region of interest is displayed after display of the decoded lower quality portion for the region surrounding the region of interest.

46. An apparatus according to claim 45, further comprising the steps of receiving the higher quality portion of the encoded image data for the region surrounding the region of interest, decoding the higher quality portion of the encoded image data for the region surrounding the region of interest, and displaying the decoded higher quality portion of the encoded image data for the region surrounding the region of interest at a position corresponding to the received coordinates for the region surrounding region of interest.

47. An apparatus according to claim 46, wherein the reception of the higher quality portion of the encoded image data for the region of interest and the region surrounding the region of interest is ordered so that the higher quality portion of the encoded image for the region of interest is received before the higher quality portion of the encoded image data for the region surrounding the region of interest.

48. An apparatus according to claim 46, wherein the reception of the higher quality portion of the encoded image data for the region of interest and the region surrounding the region of interest is ordered so that the higher quality portion of the encoded image for the region surrounding the region of interest is received before the higher quality portion of the encoded image data for the region of interest.

49. An apparatus according to claim 45, wherein the region of interest and the region surrounding the region of interest are comprised of blocks of pixels, and wherein the step of receiving is performed on the blocks of pixels.

50. An apparatus according to claim 49, wherein the blocks of pixels are received in an order starting from the center of the region of interest and spiraling outwardly toward edges of the region of interest.

51. An apparatus according to claim 45, further comprising receiving the image data and the coordinates corresponding to the image data as a data packet and unpackaging the data packet to retrieve the image data and the coordinates corresponding to the image data, wherein the steps of receiving the image data and the coordinates corresponding to the image data are comprised by receiving the data packet.

52. An apparatus according to claim 45, wherein the region of interest is identified by the first computer by calculations using the image data.

53. A computer-readable storage medium storing a computer-executable program for causing a computer to perform a method for transmitting image data of an image from a first computer to a second computer over a network, the method comprising:
encoding the image data, wherein the encoded image data has a lower quality portion and a higher quality portion;

identifying a region of interest in the image by the first computer, wherein the first computer identifies the region of interest by calculations using the image data;

transmitting coordinates for the region of interest from the first computer to the second computer;

transmitting the lower quality portion of the encoded image data for the region of interest to the second computer for decoding and display by the second computer at a position corresponding to the transmitted coordinates for the region of interest;

identifying a region surrounding the region of interest by the first computer;

transmitting coordinates for the region surrounding the region of interest to the second computer;

after transmission of the lower quality portion of the encoded image data for the region of interest, transmitting the lower quality portion of the encoded image data for the region surrounding the region of interest to the second computer for decoding and display by the second computer at a position corresponding to the transmitted coordinates for the region surrounding the region of interest; and after transmission of the lower quality portion of the encoded image data for the region surrounding the region of interest, transmitting the higher quality portion of the encoded image data for the region of interest for decoding and display by the second computer at a position corresponding to the transmitted coordinates for the region of interest.

54. An image processing module for transmitting image data of an image from a first computer to a second computer over a network, the image processing module comprising:

an encoding module constructed to encode the image data, wherein the encoded image data has a lower quality portion and a higher quality portion;

a identification module constructed to identify a region of interest in the image by the first computer, wherein the first computer identifies the region of interest by calculations using the image data, wherein the identification module is further constructed to identify a region surrounding the region of interest by the first computer;

a data transmitting module constructed to transmit coordinates for the region of interest from the first computer to the second computer, wherein the data transmitting module is further constructed to transmit the lower quality portion of the encoded image data for the region of interest to the second computer for decoding and display by the second computer at a position corresponding to the transmitted coordinates for the region of interest, to transmit coordinates for the region surrounding the region of interest to the second computer, after transmission of the lower quality portion of the encoded image data for the region of interest, to transmit the lower quality portion of the encoded image data for the region surrounding the region of interest to the second computer for decoding and display by the second computer at a position corresponding to the transmitted coordinates for the region surrounding the region of interest, and after transmission of the lower quality portion of the encoded image data for the region surrounding the region of interest, to transmit the higher quality portion of the encoded image data for the region of interest for decoding and display by the second computer at a position corresponding to the transmitted coordinates for the region of interest.

55. A computer-readable storage medium storing a computer-executable program for causing a computer to perform a method for receiving image data of an image from a first computer at a second computer over a network, the method comprising:

receiving coordinates for a region of interest from the first computer at the second computer;

receiving a lower quality portion of encoded image data for the region of interest;

decoding the lower quality portion of the encoded image data for the region of interest;

displaying the decoded lower quality portion of the encoded image data for the region of interest at a position corresponding to the received coordinates for the region of interest;

receiving coordinates for a region surrounding the region of interest at the second computer;

after reception of the lower quality portion of the encoded image data for the region of interest, receiving a lower quality portion of encoded image data for the region surrounding the region of interest;

decoding the lower quality portion of the encoded image data for the region surrounding the region of interest;

displaying the decoded lower quality portion of the encoded image data for the region surrounding the region of interest at a position corresponding to the received coordinates for the region surrounding the region of interest;

receiving a higher quality portion of the encoded image data for the region of interest;

decoding the higher quality portion of the encoded image data for the region of interest;

displaying the decoded higher quality portion of the encoded image data for the region of interest at a position corresponding to the received coordinates for the region of interest, wherein the decoded higher quality portion for the region of interest is displayed after display of the decoded lower quality portion for the region surrounding the region of interest.

56. An image processing module for receiving image data of an image from a first computer at a second computer over a network, the image processing module comprising:

a data receiving module constructed to receive coordinates for a region of interest from the first computer at the second computer, and constructed to receive a lower quality portion of encoded image data for the region of interest;

a decoding module for decoding the lower quality portion of the encoded image data for the region of interest;

a display module for displaying the decoded lower quality portion of the encoded image data for the region of interest at a position corresponding to the received coordinates for the region of interest;

wherein the data receiving module is further constructed to receive coordinates for a region surrounding the region of interest at the second computer, after reception of the lower quality portion of the encoded image data for the region of interest, to receive a lower quality portion of encoded image data for the region surrounding the region of interest, and to receive a higher quality portion of the encoded image data for the region of interest;

wherein the decoding module is further constructed to decode the lower quality portion of the encoded image data for the region surrounding the region of interest, and to decode the higher quality portion of the encoded image data for the region of interest;

wherein the display module is further constructed to display the decoded lower quality portion of the encoded image data for the region surrounding the region of interest at a position corresponding to the received coordinates for the region surrounding the region of interest, and to display the decoded higher quality portion of the encoded image data for the region of interest at a position corresponding to the received coordinates for the region of interest, wherein the decoded higher quality portion for the region of interest is displayed after display of the decoded lower quality portion for the region surrounding the region of interest.

* * * * *